United States Patent
Gong et al.

(10) Patent No.: US 7,529,674 B2
(45) Date of Patent: May 5, 2009

(54) SPEECH ANIMATION

(75) Inventors: Li Gong, San Francisco, CA (US); Townsend Duong, Santa Clara, CA (US); Andrew Yinger, Ann Arbor, MI (US)

(73) Assignee: SAP Aktiengesellschaft, Walldorf (DE)

( * ) Notice: Subject to any disclaimer, the term of this patent is extended or adjusted under 35 U.S.C. 154(b) by 1037 days.

(21) Appl. No.: 10/796,242

(22) Filed: Mar. 8, 2004

(65) Prior Publication Data

US 2005/0043955 A1 Feb. 24, 2005

Related U.S. Application Data

(60) Provisional application No. 60/495,699, filed on Aug. 18, 2003.

(51) Int. Cl.
- *G10L 11/00* (2006.01)
- *G10L 13/00* (2006.01)
- *G06F 3/16* (2006.01)
- *G06T 15/70* (2006.01)

(52) U.S. Cl. .................. 704/270; 704/258; 715/727; 345/473

(58) Field of Classification Search ............ None
See application file for complete search history.

(56) References Cited

U.S. PATENT DOCUMENTS

| | | | |
|---|---|---|---|
| 5,040,214 A | 8/1991 | Grossberg et al. | |
| 5,689,618 A | 11/1997 | Gasper et al. | |
| 5,983,190 A | 11/1999 | Trower, II et al. | |
| 5,987,415 A | 11/1999 | Breese et al. | |
| 6,151,571 A | 11/2000 | Pertrushin | |
| 6,517,935 B1 | 12/2000 | Tran et al. | |
| 6,507,811 B1 * | 1/2003 | Phillips ................ | 704/1 |
| 6,874,127 B2 | 3/2005 | Newell et al. | |
| 6,963,839 B1 * | 11/2005 | Ostermann et al. ......... | 704/260 |
| 7,085,259 B2 * | 8/2006 | Wang et al. ............... | 370/352 |
| 2002/0010589 A1 * | 1/2002 | Nashida et al. ........... | 704/275 |
| 2002/0128838 A1 | 9/2002 | Veprek | |
| 2004/0215460 A1 * | 10/2004 | Cosatto et al. ............ | 704/260 |

OTHER PUBLICATIONS

Lamb, "Generate dynamic XML using JavaServer Pages technology," IBM, Dec. 2000, 5 pages.

(Continued)

*Primary Examiner*—David R Hudspeth
*Assistant Examiner*—Brian L Albertalli
(74) *Attorney, Agent, or Firm*—Fish & Richardson P.C.

(57) ABSTRACT

Methods and systems, including computer program products, for speech animation. The system includes a speech animation engine and a client application in communication with the speech animation engine. The client application sends a request for speech animation to the speech animation engine. The request identifies data to be used to generate the speech animation, where speech animation is speech synchronized with facial expressions. The client application receives a response from the speech animation engine. The response identifies the generated speech animation. The client application uses the generated speech animation to animate a talking agent displayed on a user interface of the client application. The speech animation engine receives the request for speech animation from the client application, retrieves the data identified in the request without user intervention, generates the speech animation using the retrieved data and sends the response identifying the generated speech animation to the client application.

20 Claims, 7 Drawing Sheets

OTHER PUBLICATIONS

Bonamico et al., "Virtual Talking Heads for Tele-Education Applications" *International Conference Advances in Infrastructure for Electronic Business, Science, and Education on the Internet*, Aug. 6, 2001, 8 pages.

Ostermann et al., "Talking Heads and Synthetic Speech: An Architecture for Supporting Electronic Commerce", *Multimedia and Expo. ICME*, 2000, IEEE International Conference, New York, NY, USA, Jul. 30, 2000, pp. 71-74.

Ostermann et al., "Real-Time Streaming for the Animation of Talking Faces in Multiuser Environments", *IEEE International Symposium on Circuits and Systems Proceedings IEEE*, Piscataway, NJ, USA, 2002, pp. 1437-1440.

Pandzic "An XML Based Interactive Multimedia News System" *Department of Telecommunications Faculty of Electrical Engineering and Computing Zagreb University*, Croatia, Jun. 22, 2003, 5 pages.

Pandzic "Life on the Web" *Software Focus Journal*, 2001, vol. 2, No. 2, pp. 52-59.

Pulse™, User Guide—Pulse Audio Manager™, Version 3.1, Jul. 2003.

* cited by examiner

```
<fata-data>                              610
    <talking-head-data name*=[alias]
        emotion=[emotion]
        expression=[expression]
        look=[look direction]      620
        voice*=[voice name]>        /      630
        <speech-files type*=[set|pool]>     /
            <speech-data type*=[talking-head data|textFile|pwcFile|static|fataData]
                emotion=[emotion]
                expression=[expression]
                look=[look direction]
                voice=[voice name]
                value*=[alias|path|text|value]/>
</fata-data>
```

FIG. 6A

```
<fata-data>
    <talking-head-data name="RES-completely-random"
        emotion="happy"
        voice="Sam">                                              640
        <speech-files type="pool">                                 /        650
            <speech-data type="talking-head-data" value="RES-canned-greeting"/>
            <speech-data type="static" value="Hello, how random this is." emotion="neutral"/>
            <speech-data type="textFile" value="/dir/someText.txt" voice="Tom"/>
            <speech-data type="pwcFile" value="/dir/pwc/hello.pwc" look="up"/>   660
            <speech-data type="fataData" value="Username" expression="nod"/>   670
        </speech-files>
</fata-data>                                                                  680
```

FIG. 6B 710　　　　　　　　720

There is nothing better than a <fataData value="ProductName"/> for a gift.

FIG. 7A

```
<speech-files type="set">
    <speech-data type="static" value="There is nothing better than a"/>
    <speech-data type="fataData" value="ProductName"/>
    <speech-data type="static" value="for a gift."/>
</speech-files>
```

FIG. 7B

There is nothing better than a Grand Doohickey for a gift.

FIG. 7C

SPEECH ANIMATION

CROSS-REFERENCE TO RELATED APPLICATIONS

This application claims priority based on U.S. Patent Application No. 60/495,699 for Dynamic Data-Driven Speech Animation and Intelligent Behaviors, filed Aug. 18, 2003.

BACKGROUND

The present invention relates to data processing by digital computer, and more particularly to speech animation. Speech animation refers to speech that is synchronized with facial expressions.

Existing speech animation systems require user intervention to feed input text into the system. Typically, users must either manually enter the text or manually load a text file into the system.

SUMMARY OF THE INVENTION

In general, in one aspect, the present invention provides methods and systems, including computer program products, implementing techniques for speech animation.

The techniques include receiving a request from a client application for speech animation, the request identifying data to be used to generate the speech animation, the speech animation being speech synchronized with facial expressions; retrieving the data without user intervention; generating the speech animation using the retrieved data; and sending a response identifying the generated speech animation to the client application.

The system includes a speech animation engine and a client application in communication with the speech animation engine. The client application sends a request for speech animation to the speech animation engine. The request identifies data to be used to generate the speech animation, where speech animation is speech synchronized with facial expressions. The client application receives a response from the speech animation engine. The response identifies the generated speech animation. The client application uses the generated speech animation to animate a talking agent displayed on a user interface of the client application. The speech animation engine receives the request for speech animation from the client application, retrieves the data identified in the request without user intervention, generates the speech animation using the retrieved data and sends the response identifying the generated speech animation to the client application.

Implementations may include one or more of the following features:

Retrieving the data includes retrieving the data in real time. The data specifies text to be used to generate the speech animation. The text includes variable elements. The data specifies a voice to be used to generate the speech animation. The data specifies a pool of synonyms and generating the speech animation includes selecting a synonym from the pool of synonyms.

The request further identifies context information taken from a live session of the client application; and generating the speech animation includes incorporating the context information into the generated speech animation. The context information includes information about a user of the client application.

The client application is a web application; and the request is an HTTP request.

The invention can be implemented to realize one or more of the following advantages:

The raw data used to generate the speech animation content is retrieved automatically by the system. Manual feeding of text into the system is no longer required. This makes the system more scalable.

The raw data is retrieved in real time, rather than in advance. This ensures that the most up-to-date version of the data is retrieved.

The raw data includes dynamic or variable elements. The variable elements are adapted to suit a particular client application or user of the client application. This enables the speech animation content to be more interesting and personalized and makes the speech animation client appear more socially intelligent to a user of the client application. This also enables the system to be more scalable because the number of different speech utterances in the speech animation output is not limited by the input text. The dynamic elements enable the system to generate a potentially infinite number of variations to the input text.

It is easy for client applications to integrate or interface with the system. The system provides a single point of entry for all client requests. Also, the system provides a set of custom scripting tags that developers of client applications can incorporate into the user interface code for the client applications. These tags expand into code that invokes the system.

One implementation of the invention provides all of the above advantages.

The details of one or more implementations are set forth in the accompanying drawings and the description below. Further features, aspects, and advantages of the invention will become apparent from the description, the drawings, and the claims.

BRIEF DESCRIPTION OF THE DRAWINGS

FIG. 6A is an example of an XML schema used by the system.

FIG. 6B is an example of XML data used by the system.

FIG. 7A is an example of a dynamic text template that uses custom markup tags.

FIG. 7B is an example of a dynamic text template that uses speech sets.

FIG. 7C is an example of static text produced from a dynamic text template.

Like reference numbers and designations in the various drawings indicate like elements.

DETAILED DESCRIPTION

Figure 1:
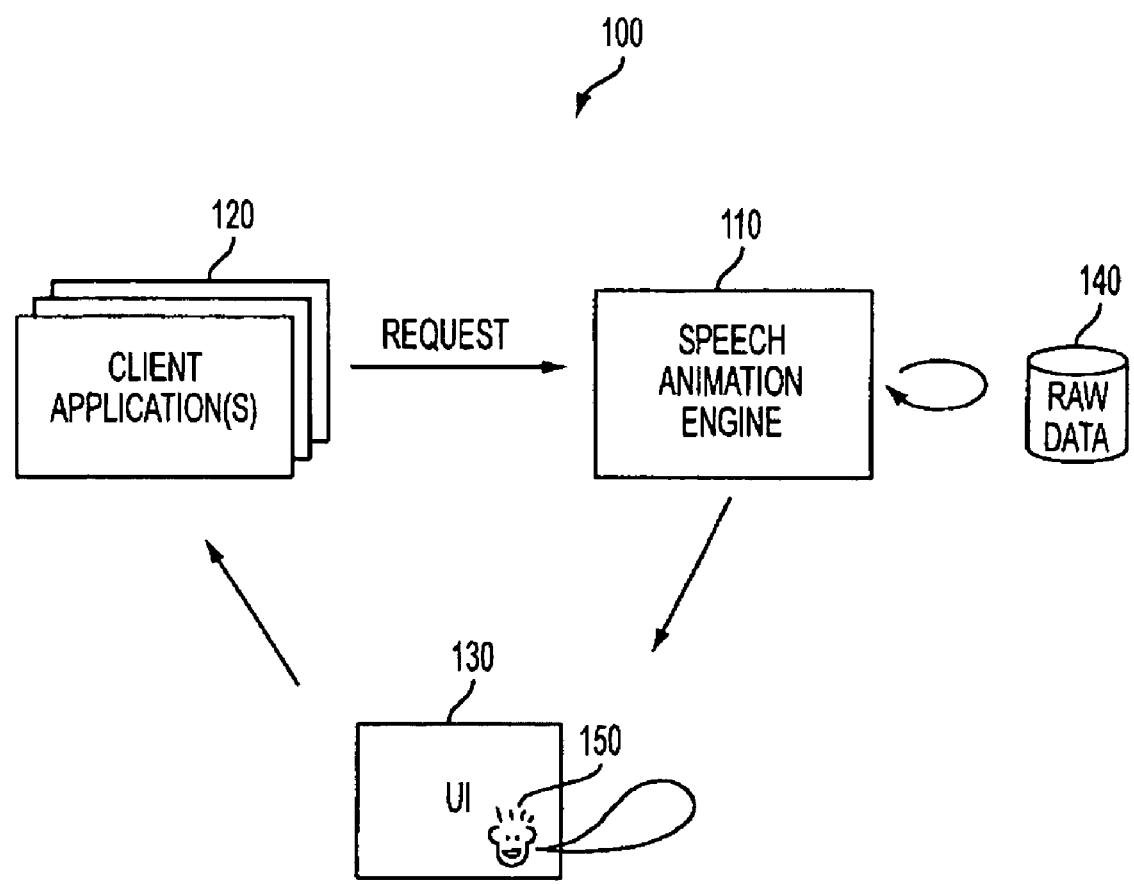
FIG. 1 is a block diagram of a system in accordance with the invention.

As shown in FIG. 1, a system 100 includes a speech animation engine 110 and one or more client applications 120. The client applications can include a variety of different application programs including, but not limited to: a personal information management application program, an application program to process a business transaction, an application program to operate a computing device, an entertainment application program, or a game. To provide for interaction with a user, the client applications 120 run on a computer having a display device for displaying visual content to the user and an audio device for providing audio content to the user.

The client applications 120 make requests to the speech animation engine 110 for code that displays or animates a talking agent 150 on the client application's user interface 130. The talking agent is represented graphically on the user interface 130 in the form of a cartoon head, animal or some other graphical icon. These animation requests identify the raw data 140 to be used to generate the speech animation content for the talking agent 150.

Figure 2:
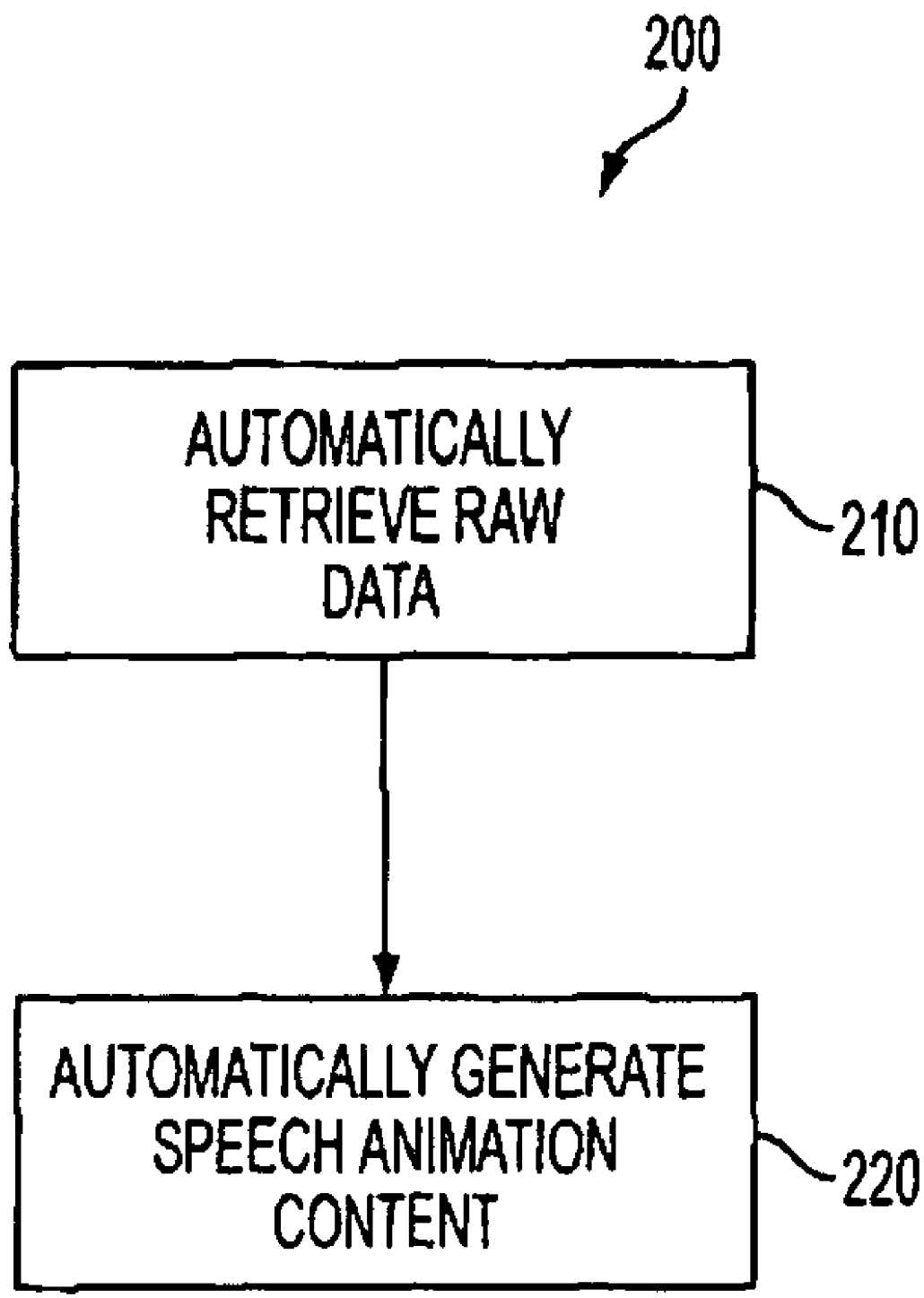
FIG. 2 is a flow diagram of a method in accordance with the invention.

In response to such animation requests, as shown by method 200 of FIG. 2, the speech animation engine 110 retrieves the raw data (step 210) and generates speech animation content based on the raw data (step 220). The raw data 140 is stored in a location accessible by the speech animation engine. The speech animation engine 110 performs the retrieval and generation steps automatically, that is, without user intervention. In addition, the retrieval and generation steps can occur in real time, as requests are made, as opposed to occurring in advance of the requests.

Figure 3:
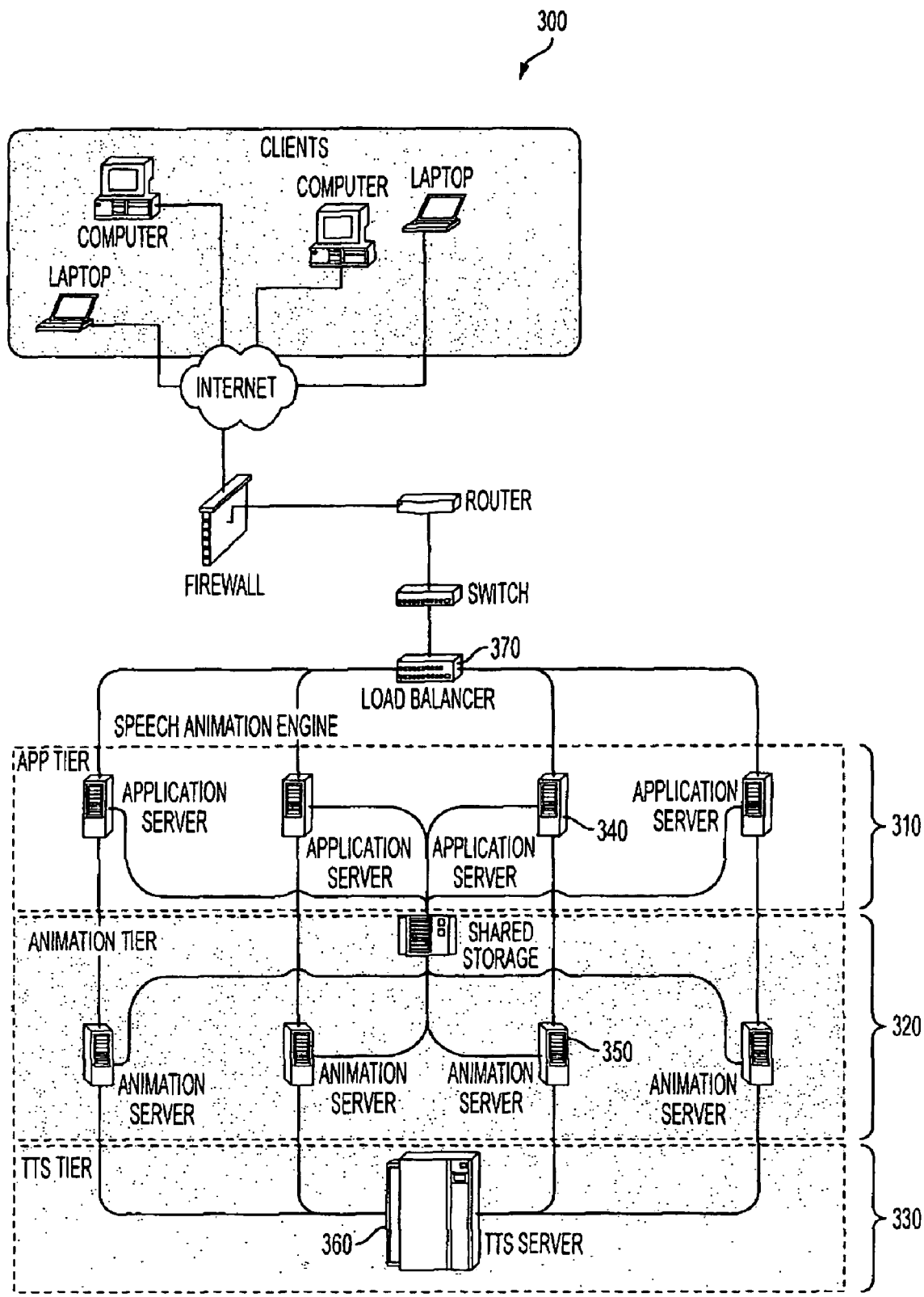
FIGS. 3 and 4 are block diagrams of one implementation of the system where the system includes an application tier.
Figure 4:
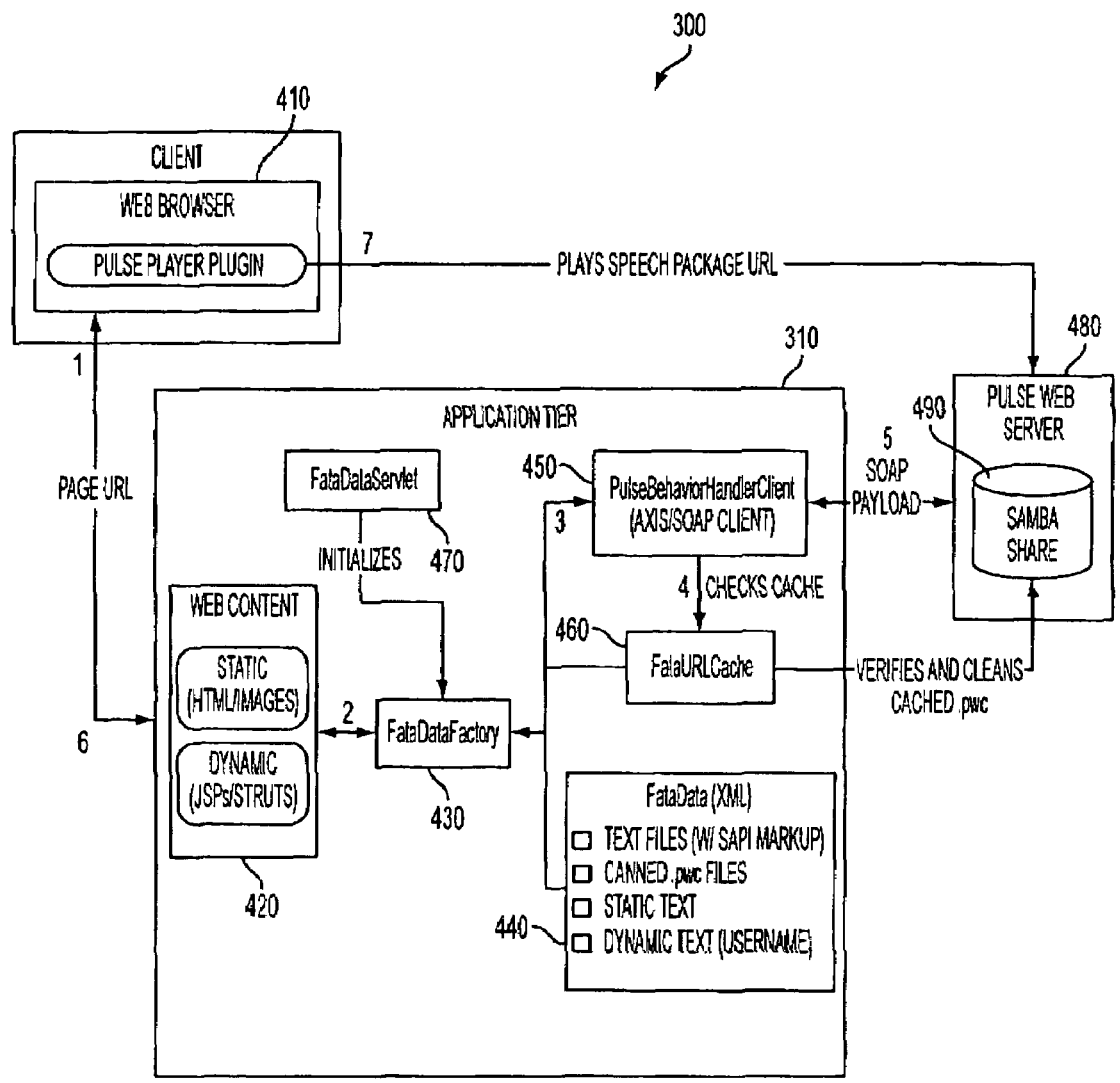

FIGS. 3 and 4 illustrate one implementation 300 of the system 100. In this implementation 300, the speech animation engine 110 includes an application tier 310, an animation tier 320 and a text-to-speech (TTS) tier 330.

The application tier 310 includes one or more application servers 340, for example, Tomcat servers. The application servers 340 have access to the raw data 140 identified in the animation requests. The raw data is retrieved using a connectivity technology such as JDBC (Java Database Connectivity), a technique for connecting programs written in Java to a variety of different databases.

The animation tier 320 includes one or more animation servers 350. The animation servers are operable to convert audio data generated by the TTS tier into speech animation content. The generated speech animation content is saved to a web-based file share or other storage mechanism that is accessible by the client applications 120. The animation servers 350 can be implemented using a variety of different speech animation technologies including CrazyTalk by Reallusion or Pulse Server by Pulse. The Pulse server is an Apache web server module that is initialized and made available by an Apache web server. Speech animation content generated by Pulse is represented in pwc format.

The TTS tier 330 includes one or more TTS servers 360. The TTS servers 360 are operable to convert textual data to audio (speech) data. The text data can be represented in a variety of text-to-speech markup formats including the Microsoft Speech Application Programming Interface (SAPI) 5.1 format. Text markup will be described in more detail below. The audio data can be represented in a variety of formats including the wav format. Data is exchanged between the TTS tier 330 and the animation tier 320 using a connectivity technology such as SAPInet Server by Pulse.

To improve system performance, more than one server can be deployed in a given tier. When multiple servers are deployed, a load balancer 370 can be used to manage distribution of workload. It is not necessary to have a one-to-one relationship between the servers in the different tiers.

Optionally, a caching mechanism is employed to improved system performance. Caching will be discussed in more detail below with reference to the FataURLCache.

In this implementation 300, as shown in FIG. 4, the client application 120 is a web-based application whose interface is rendered in a web browser 410. The web browser 410 must be able to render the animation. If this functionality is not already built into the web browser, the browser can be extended by installing a browser plug-in.

The application tier 310 includes a web content subsystem 420 that is accessible to the web browser 410. The web content includes static content, such as HTML (Hypertext Markup Language) text and images, and dynamic content, such as JSP (JavaServer Pages) code. The JSP code invokes services provided by the FataDataFactory 430, another subsystem of the application tier 310. These services include services that display and animate the talking agent 150 on the client's user interface.

The FataDataFactory subsystem 430 is the single point of entry for all animation requests from client applications 120. The FataDataFactory subsystem manages and provides access to FataData 440, raw data that is used by the system to generate the speech animation content. All or portions of the FataData can be represented in XML (eXtensible Markup Language) format. XML will be discussed below with reference to FIGS. 6A and 6B. The FataDataFactory subsystem 430 also provides access to external data sources such as databases that reside outside the system.

A PulseBehaviorHandlerClient subsystem 450 is responsible for conveying the animation requests to the Pulse server on the animation tier 320. The PulseBehaviorHandlerClient subsystem 450 first converts the animation requests into SOAP payloads, and then sends the requests to a dispatcher component of the Pulse server.

A FataURLCache subsystem 460 manages a cache on the shared-storage. The cache includes speech animation content as well as mappings between FataData objects and the speech animation content. The FataURLCache subsystem 460 checks each animation request against the cache first, speeding up responses if an identical animation request has previously been made. The FataURLCache subsystem 460 is responsible for removing content from the cache when the cache is full or when the content is no longer accessible.

System Initialization and Operation

To use the system 300, a client application 120 first instantiates the FataDataFactory 430 and the FataURLCache 460. The FataDataFactory 430 will then load all of the FataData 440. The FataData 440 is loaded dynamically during run time rather than in advance to ensure that the most up-to-date version of the FataData 440 is loaded.

As illustrated, the system 300 can provide a servlet program 470 that initializes the FataDataFactory 430, the FataURLCache 460 and the FataData 440. The servlet 470 also registers the FataDataFactory with the current servlet context, so that the client application 120 may have access to the services provided by the FataDataFactory. The servlet 470 is also responsible for destroying these subsystems and loaded resources during system shutdown.

Figure 5:
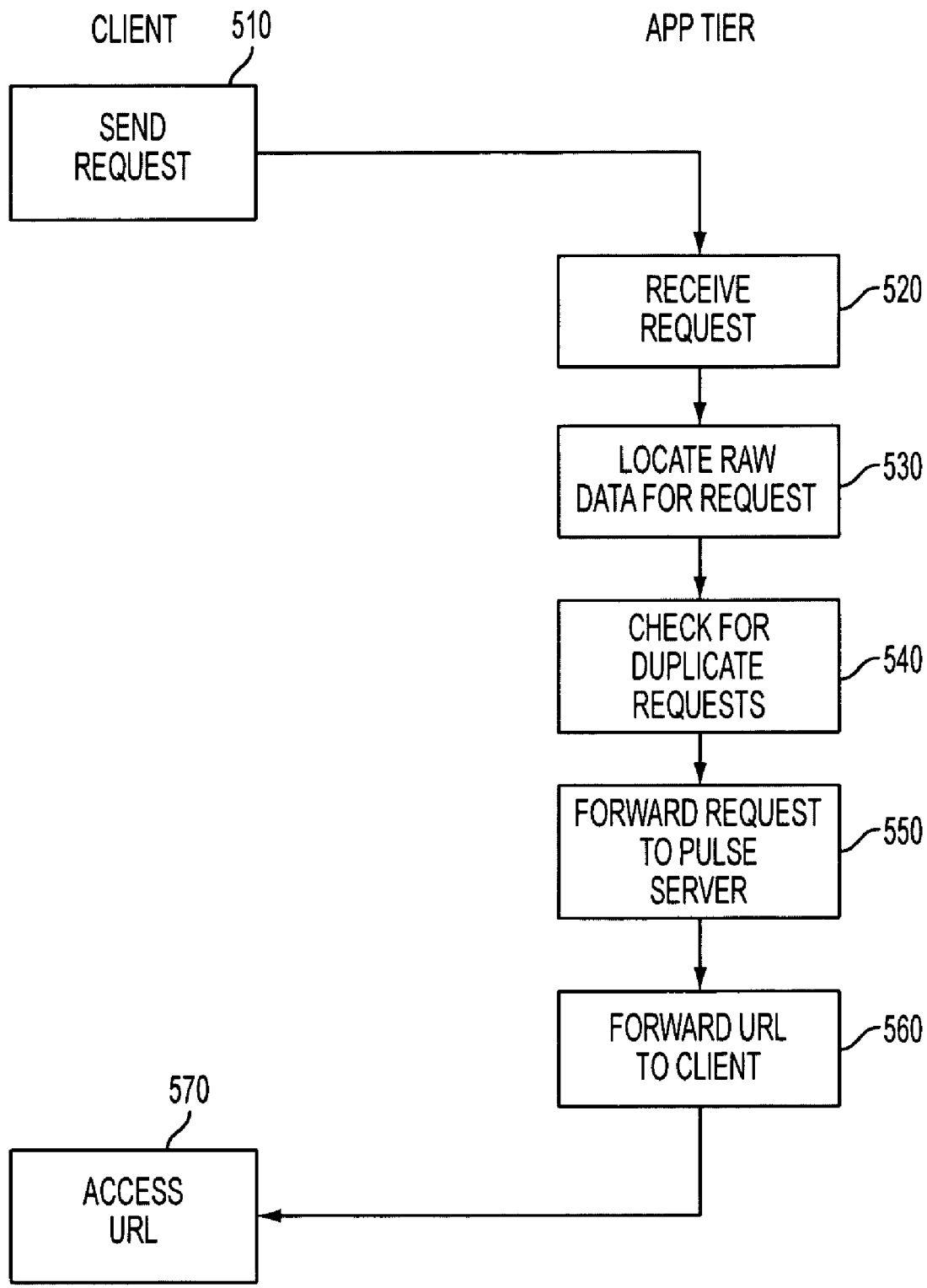
FIG. 5 is a flow diagram of data flow within the application tier.

After system initialization is complete, the system 300 is ready to process client requests. As shown by method 500 of FIG. 5, a typically request-response cycle begins when the client application 120 sends an HTTP (Hypertext Transfer Protocol) request to the system through the web content subsystem (step 510). The HTTP request can be a request to load a talking agent or a request to animate an already loaded talking agent. The request to load a talking agent includes a parameter that identifies the talking agent 150 to be loaded. The request to animate a talking agent includes a parameter that identifies the raw data 140 to be used to generate the speech animation content.

The request is received by the FataDataFactory (step 520). The FataDataFactory locates all the FataData needed to complete the request (step 530). For example, the FataDataFactory 430 can match the request parameters against a map or table of all the FataData. The FataDataFactory 430 then converts the request into a format compatible with the PulseBehaviorHandlerClient 450 and forwards the request to the PulseBehaviorHandlerClient 450. The PulseBehaviorHandlerClient 450 sends the request to the Pulse server 480 as a SOAP payload (step 550). Prior to sending the request to the Pulse server 480, the PulseBehaviorHandlerClient 450 checks the FataURLCache to see if the request is identical to any of the cached requests (step 540). If it is, then the PulseBehaviorHandlerClient 450 does not need to send the request to the Pulse server 480. If it is not, then the request is sent to the Pulse server 480.

Upon receiving the request, the Pulse server 480 generates the requested speech animation content and saves it to the shared-storage 490. The system then returns the URL of the speech animation content to the client (step 560), which uses the URL to access the content (step 570).

The above-described data flow is just an example. Other variations are possible. For example, instead of the PulseBehaviorHandlerClient 450 checking the cache, the FataDataFactory 430 can perform this check.

Additional Features

The following paragraphs describe additional features that can be incorporated into the above-described systems and methods.

Event-Driven Communication

In an event-driven or push implementation, after the main content has already been delivered to the client, the system maintains an open connection to the client so that it can continue to push additional content to the client after the main content has already been delivered and rendered. Whenever the system needs to change the content, it can deliver client-side scripts and Dynamic HTML (DHTML) to make the change. Pushlets offer one framework for pushing events to a web-based client, although other frameworks may be used.

Alternatively, a polling mechanism may be used instead of push to eliminate the need for a constant connection between the client and the system. With polling, the system may need to include data structures for storing the state of the client after an initial request and then restoring the state of the client for a subsequent request.

Custom Tags

To make it easier for client applications 120 to interface with and make use of the speech animation system, the system can provide a set of custom scripting tags that developers of client applications can incorporate into the user interface code for the client applications. These tags expand into code that sends the animation requests to the speech animation system. The tags include a renderTalkingAgentJS tag, a renderFataJS tag and a renderRawJS tag.

renderTalkingAgentJS Tag

This tag generates the code to set up and display the talking agent 150 as part of the user interface 130 for the client application 120. The only required parameter for this tag is the address or URL (uniform resource locator) of the talking agent file. Optional parameters include the width, height, and background color of the talking agent.

The following JSP(JavaServer Pages) code fragment illustrates use of this tag: <renderTalkingAgentJS path="/TalkingAgents/bob/bob.pwr" width="160" height="210" bgColor="bcbdc2"/>. This code renders a JavaScript function call that sets up the talking agent "/TalkingAgents/bob/bob.pwr" with width of 160 pixels and height of 210 pixels using a background color of "bcbdc2" (a grayish color).

renderFataJS Tag

This tag generates the code that animates the talking agent 150 and causes it to speak. Only one parameter is required for this file: a name parameter that identifies the name of the speech animation file to be used for the talking agent.

The following JSP code fragment illustrates use of this tag: <renderFataJS name="RES-greeting"/>. This code renders a JavaScript function call that causes the talking agent to speak and behave according to the contents of the FataData named "RES-greeting".

renderRawJS Tag

This tag is used as an alternative to the renderFataJS tag. This tag allows speech animation data to be specified explicitly. Two parameters are used for this tag: A text parameter that specifies the text to be spoken and a voice parameter that identifies which voice to speak in. Optional parameters include the emotion (e.g., happy, unhappy, neutral), look (e.g., up, down, right, left), and expression (e.g., angry, confused, grin).

The following JSP code fragment illustrates use of this tag:
 <renderRawJS voice="Mary" text="Hello hot-stuff." emotion="happy" expression="wink"/>. This renders a JavaScript function call that causes the talking agent 150 to speak and animate the text "Hello hot-stuff" with the emotion "happy" and the expression "wink" using the voice "Mary".

XML Format

FIGS. 6A and 6B illustrate how the FataData 440 can be structured in XML. FIG. 6A shows an example XML schema and FIG. 6B shows an implementation of this example schema.

In FIG. 6A, the symbol (*) indicates required attributes. As illustrated, each <talking-head-data> element 610 has a required name (or alias), voice, and speech file. The remaining attributes (emotion, expression, and look) are optional.

Each <speech-files> element 620 typically has only one attribute, the type, which may be one of two values: "set", or "pool". A set means that the set of <speech-data> elements associated with the <speech-files> element should be played in sequence. A pool indicates that a single <speech-data> element should be chosen randomly from the set. The pool can be used to define a pool of synonyms. Synonyms are equivalent content that can be used interchangeably. The use of synonyms enables the speech content to be variable. This makes the talking agent appear more socially intelligent to a user.

Each <speech-data> element 630 contains the type and content of the raw data that is to be turned into speech by the TTS server. The content of this data depends heavily on the type. Special types of note are:

'talking-head-data'—a pointer to another talking-head-data alias in the XML;

'textFile'—a reference to an external text file containing the text to speak;

'pwcFile'—a reference to a pre-generated speech animation file in pwc format (the format used by the Pulse server);

'static'—raw text defined directly in the XML;

'fataData'—dynamic data to be replaced based on the 'value'.

FIG. 6B illustrates an example of how the schema defined in FIG. 6A could be used to define an instance of the FataData 440. In this example, the XML code defines an animated greeting. The content of the animated greeting is randomly selected from a pool of synonymous content including:

a reference to content defined in another FataData file 640;

content to be dynamically generated based on some static text 650;

content to be dynamically generated based on text stored in an external text file 660;

pre-generated content 670;

and a dynamic content field to be replaced by the user's name 680.

Dynamic content will be discussed in more detail below.

Text Markup

The text included in the FataData 440 can include markup tags including TTS markup tags and custom markup tags.

TTS Markup

TTS markup tags define prosodic, pronunciation, intonation or inflection settings for the speech. The TTS markup tags can be implemented in a variety of text-to-speech markup formats including the Microsoft Speech Application Programming Interface (SAPI) 5.1 format and the VoiceXML format. The TTS markup is preserved by the application server and passed to the animation server, which in turn passes it to the TTS server.

Dynamic Text Templates

Custom markup tags are used to insert dynamic elements into the text to produce a dynamic text template. Custom markup tags can be implemented in a variety of text markup formats including XML. Custom markup tags are expanded by the application server before being passed to the animation server.

The expansion involves filling in or supplying a value for the dynamic elements. The supplied value can come from the current application session. This is further illustrated by the dynamic text template shown in FIG. 7A. This template includes some static text elements 710 as well as a dynamic element 720. The value of "ProductName" will differ depending on which product the user has selected. FIG. 7C shows the resulting expanded text when the product "Grand Doohickey" has been selected.

An alternative method to create a dynamic text template is using the speech sets described above with respect to FIG. 6. FIG. 7B illustrates use of speech sets to create a dynamic template that is equivalent in content to the one shown in FIG. 7A.

While equivalent in content, the two types of dynamic templates may not necessarily be equivalent in performance because the system may process the two types differently. Speech sets are typically processed as segments that are then spoken in series to form the whole. By contrast, when using custom markup, the entire text is typically expanded and processed as a whole.

Thus, one advantage of using custom markup is that there will be little or no pause between segments for loading speech files and the speech will not have unnatural breaks in the middle of sentences due to the segmentation of the text.

At the same time, one advantage of using speech sets is that the response time is typically faster than using custom markup. Segments without dynamic elements can be cached and re-used repeatedly without having to be processed again. Caching also helps to reduce or eliminate the pause between speech segments.

Adaptive Content

In one implementation, the generated speech animation content is customized for a particular client application or user of the client application. In such cases, the request from the client further includes context information. The context information can be information about the particular application session (e.g., how long the session has been active) or information about a particular user of the application, for example, his personal characteristics (such as name, age, gender, ethnicity or national origin information, and preferred language) or his professional characteristics about the user (such as occupation, position of employment, and one or more affiliated organizations).

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular implementations. Other implementations are within the scope of the following claims. For example, the steps of the invention can be performed in a different order and still achieve desirable results.

What is claimed is:

1. A computer-implemented method comprising:
    accessing a request to provide speech animation content to a user using a graphically represented, animated talking agent, the request comprising:
        emotion, expression, look direction, and voice parameters for the animated talking agent;
        speech elements including textual content data to be spoken by the animated talking agent, at least a portion of the textual content data being dynamically derived from an item selected by the user in a current application session;
        a speech attribute defining whether the speech elements are to be sequentially or randomly provided; and
        context information identifying a characteristic of the user, the characteristic being used to customize the generated speech animation;
    identifying raw data to be used to generate speech animation content based on the request;
    generating the speech animation content adapted for the user, using the identified raw data; and
    providing the generated speech animation content for display to the user.

2. The computer-implemented method of claim 1, wherein the item selected by the user is a product for sale via a website viewed by the user.

3. The computer-implemented method of claim 1, wherein the characteristic of the user is one of a name, an age, a gender, an ethnicity, a national origin, a language, an occupation, a position of employment, or an organization affiliated with the user.

4. The computer-implemented method of claim 1, wherein identifying raw data to be used to generate speech animation content comprises comparing the request to provide speech animation content against a cache of previous requests, and wherein generating the speech animation content comprises retrieving previously generated speech animation if the request is identical to a previous request.

5. The computer-implemented method of claim 1, comprising accessing another request to provide speech animation content to the user, the other request comprising a reference to content specified in a different request from the other request.

6. The computer-implemented method of claim 1, comprising accessing another request to provide speech animation content to the user, the other request comprising a static value specifying static text to be spoken by the talking agent.

7. The computer-implemented method of claim 1, comprising accessing another request to provide speech animation content to the user, the other request comprising a reference to pre-generated speech animation.

8. The computer-implemented method of claim 1, comprising:
    maintaining an open connection to the user after providing the generated speech animation; and
    pushing additional speech animation through the open connection to the user after providing the generated speech animation content for display to the user.

9. The computer-implemented method of claim 1, comprising:
    polling a data structure associated with the user after accessing the request to provide speech animation content to the user; and
    generating additional speech animation content for display to the user based on the polled data structure.

10. A computer-readable medium encoded with a computer program, the computer program comprising instructions that, when executed, operate to cause a computer to perform operations comprising:
    accessing a request to provide speech animation content to a user using a graphically represented, animated talking agent, the request comprising:
        emotion, expression, look direction, and voice parameters for the animated talking agent;
        speech elements including textual content data to be spoken by the animated talking agent, at least a portion of the textual content data being dynamically derived from an item selected by the user in a current application session;
        a speech attribute defining whether the speech elements are to be sequentially or randomly provided; and
        context information identifying a characteristic of the user, the characteristic being used to customize the generated speech animation;
    identifying raw data to be used to generate speech animation content based on the request;
    generating the speech animation content adapted for the user, using the identified raw data; and
    providing the generated speech animation content for display to the user.

11. The system of claim 10, wherein accessing the request includes accessing the request in real time.

12. The system of claim 10, wherein:
    the textual content data specifies a pool of synonyms; and
    generating the speech animation includes selecting a synonym from the pool of synonyms.

13. The system of claim 10, wherein generating the speech animation content includes incorporating the context information into spoken text of the generated speech animation.

14. The system of claim 10, wherein:
    the request is accessed via a web application; and
    the request is an HTTP request.

15. A system comprising:
    one or more computers; and
    a computer-readable medium coupled to the one or more computers having instructions stored thereon which, when executed by the one or more computers, causes the one or more computers to perform operations comprising:
        accessing a request to provide speech animation content to a user using a graphically represented, animated talking agent, the request comprising:
            emotion, expression, look direction, and voice parameters for the animated talking agent;
            speech elements including textual content data to be spoken by the animated talking agent, at least a portion of the textual content data being dynamically derived from an item selected by the user in a current application session;
a speech attribute defining whether the speech elements are to be sequentially or randomly provided; and
context information identifying a characteristic of the user, the characteristic being used to customize the generated speech animation;
identifying raw data to be used to generate speech animation content based on the request;
generating the speech animation content adapted for the user, using the identified raw data; and
providing the generated speech animation content for display to the user.

16. The system of claim 15, wherein the textual content data includes markup tags that define prosodic, pronunciation, intonation, or inflection settings for speech.

17. The system of claim 15, wherein the textual content data includes markup tags that are used to insert dynamic elements.

18. The system of claim 15, wherein the textual content data includes static text.

19. The system of claim 15, wherein the context information includes information about how long an application session has been active.

20. The system of claim 15, wherein generating the speech animation content comprises retrieving part of the speech animation content from a cache and combining the retrieved part of the speech animation content with a part of the speech animation content dynamically generated and referencing the item selected by the user.

* * * * *